(12) United States Patent
Lee

(10) Patent No.: US 10,498,216 B1
(45) Date of Patent: Dec. 3, 2019

(54) DEVICE FOR CONTROLLING INVERTER

(71) Applicant: LSIS CO., LTD., Anyang-si, Gyeonggi-do (KR)

(72) Inventor: Hak-Jun Lee, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/295,844

(22) Filed: Mar. 7, 2019

(30) Foreign Application Priority Data

May 31, 2018 (KR) ........................ 10-2018-0062310

(51) Int. Cl.
  *H02M 3/335* (2006.01)
  *H02M 1/08* (2006.01)
  *H02M 7/48* (2007.01)
  *H02P 21/22* (2016.01)
  *H02P 27/08* (2006.01)
  *H02M 1/00* (2006.01)

(52) U.S. Cl.
  CPC ............. *H02M 1/08* (2013.01); *H02M 3/335* (2013.01); *H02M 7/48* (2013.01); *H02P 21/22* (2016.02); *H02P 27/08* (2013.01); *H02M 2001/0048* (2013.01)

(58) Field of Classification Search
  None
  See application file for complete search history.

(56) References Cited

U.S. PATENT DOCUMENTS

| 6,023,417 A * | 2/2000 | Hava | H02M 7/53875 |
| | | | 318/811 |
| 9,654,028 B1 | 5/2017 | Luo et al. | |
| 2008/0100254 A1* | 5/2008 | Rahman | H02P 21/22 |
| | | | 318/715 |
| 2011/0141786 A1* | 6/2011 | Shen | H02M 7/487 |
| | | | 363/131 |

(Continued)

FOREIGN PATENT DOCUMENTS

| EP | 3082247 A2 | 10/2016 |
| KR | 20160122923 A | 10/2016 |

OTHER PUBLICATIONS

European Search Report for related European Application No. 19161447.8; action dated Sep. 9, 2019; (10 pages).

(Continued)

*Primary Examiner* — Jeffrey A Gblende
(74) *Attorney, Agent, or Firm* — K&L Gates LLP

(57) ABSTRACT

Disclosed is a device for controlling an inverter. The device achieves a minimum switching loss in a discontinuous modulation duration regardless of a power factor. The device includes: a command voltage transform unit configured for transforming each of 3 phases command voltages into each of pole command voltages using the DC stage voltage, a pulse width modulation index, a discontinuous modulation angle corresponding to a discontinuous modulation duration, and each phase difference between each of the 3 phase command voltages and each of 3 phases output currents of the inverting module; and a controller configured for generating a control signal based on a comparison between each pole command voltage and a triangular carrier wave, wherein the control signal controls upper and lower switching elements of each phase leg.

10 Claims, 10 Drawing Sheets

(56) References Cited

U.S. PATENT DOCUMENTS

2012/0249046 A1 10/2012 Soares et al.
2016/0308460 A1* 10/2016 Lee .................... H02M 7/44

OTHER PUBLICATIONS

Lee, et al.; "A Carrier-based Adjustable Discontinuous PWM for Three-Phase Voltage Source Inverter"; 2015, IEEE; 6 pages).
Bierhoff, et al.; An Analysis on Switching Loss Optimized PWM Strategies for Three Phase PWM Voltage Source Converters; Faculty of Engineering, Christian-Albrechts-University of Kiel; Nov. 5-8, 2007; (6 pages).
Korean Office Action for related Koran Application No. 10-2018-0062310; action dated Jul. 30, 2019; (4 pages).

* cited by examiner

FIG. 1
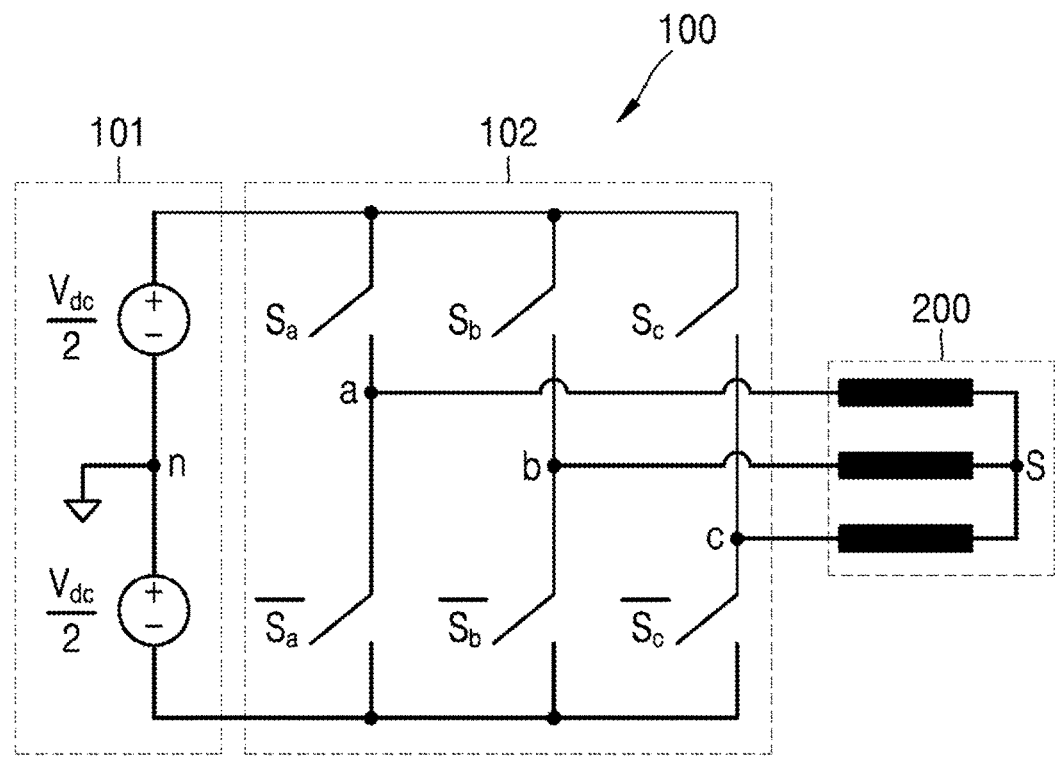
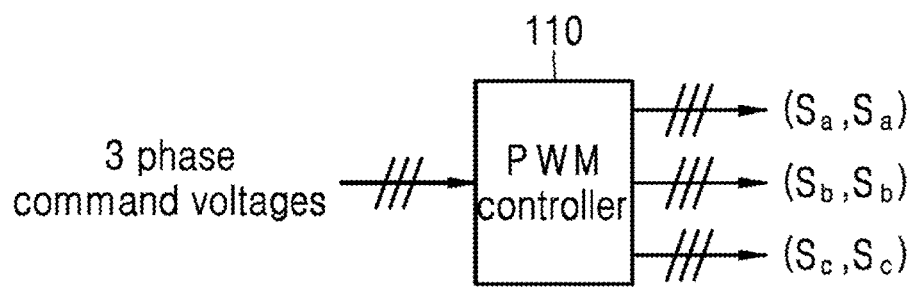

FIG. 2
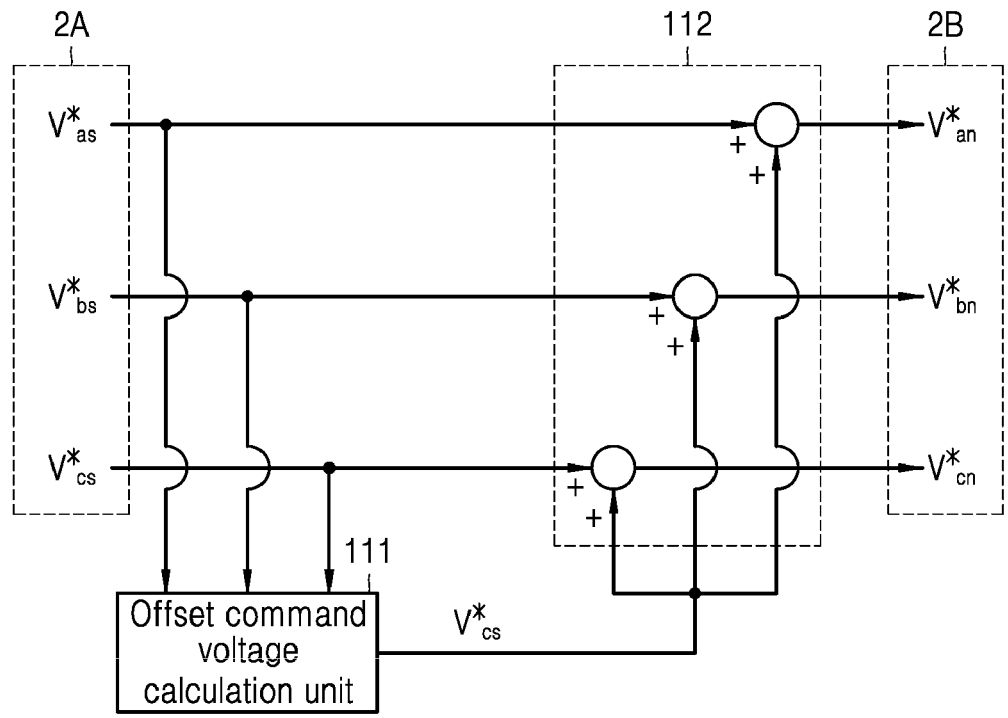
(a)
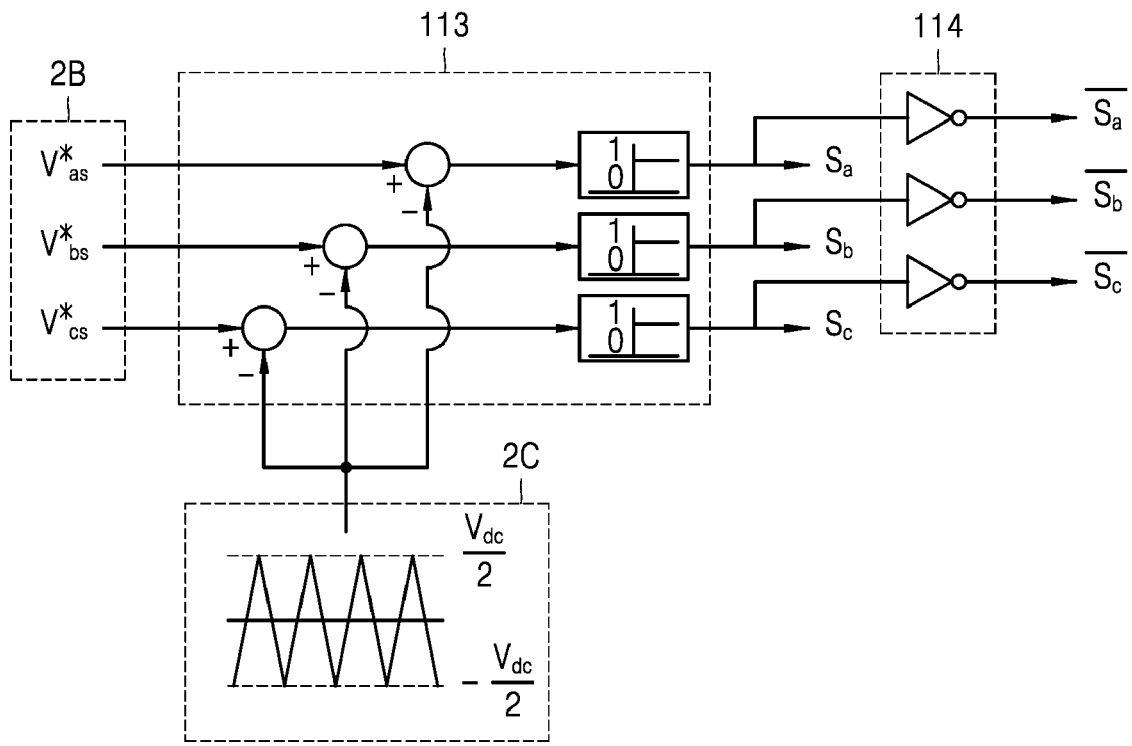
(b)

【FIG. 3】
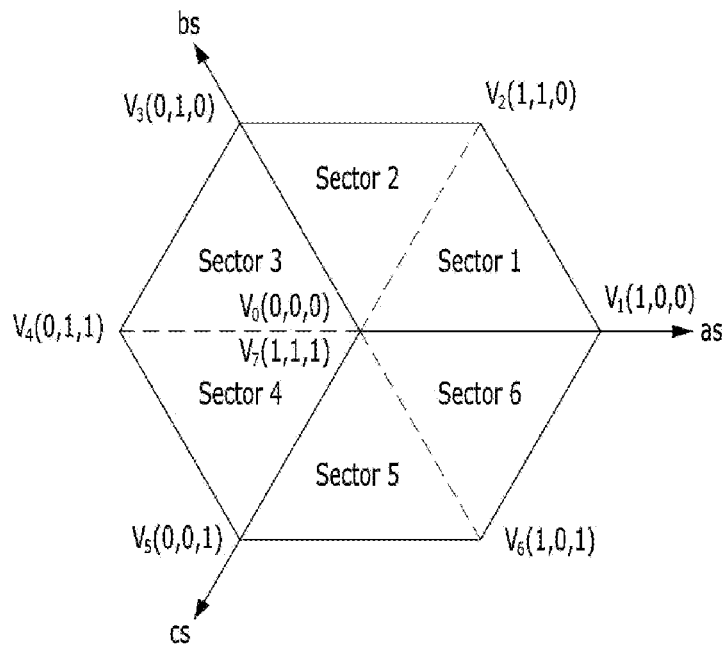
【FIG. 4】
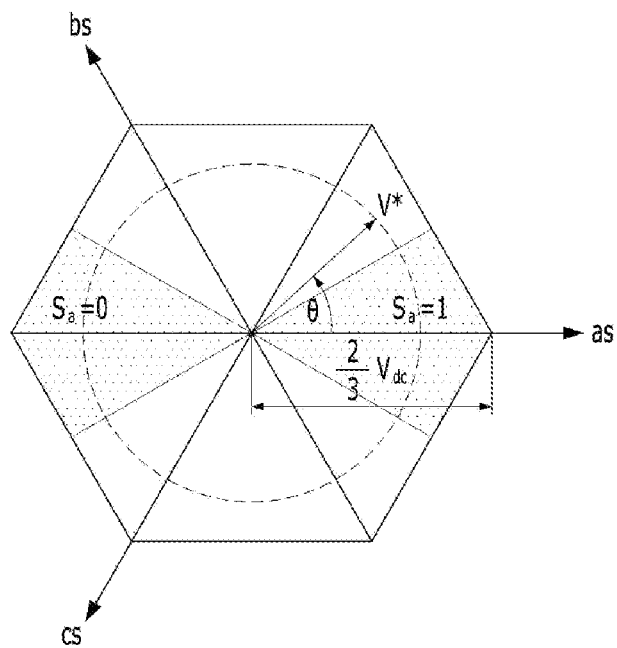

【FIG. 5】
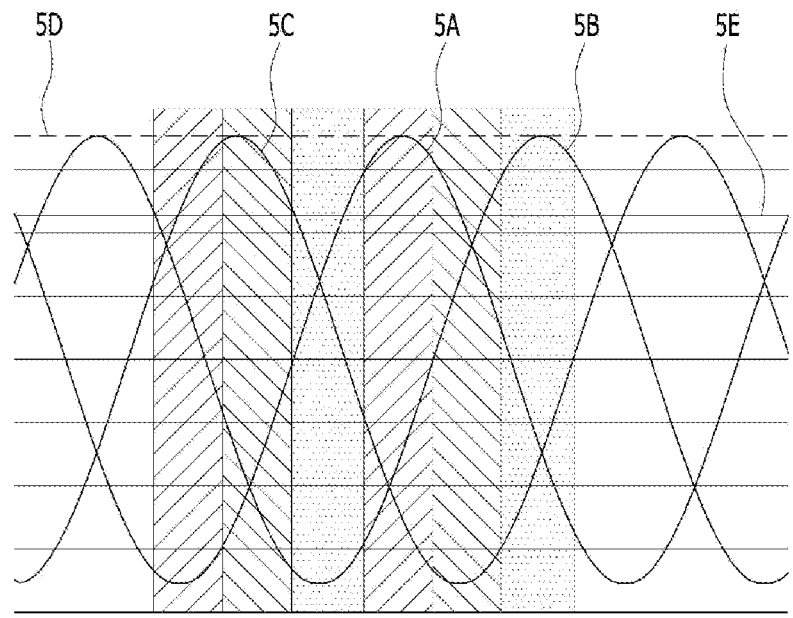
【FIG. 6】
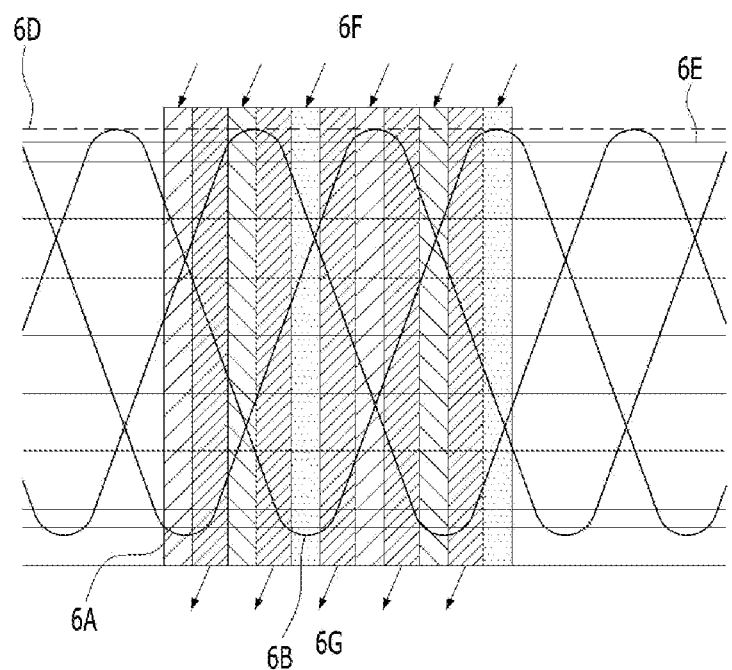

【FIG. 12】
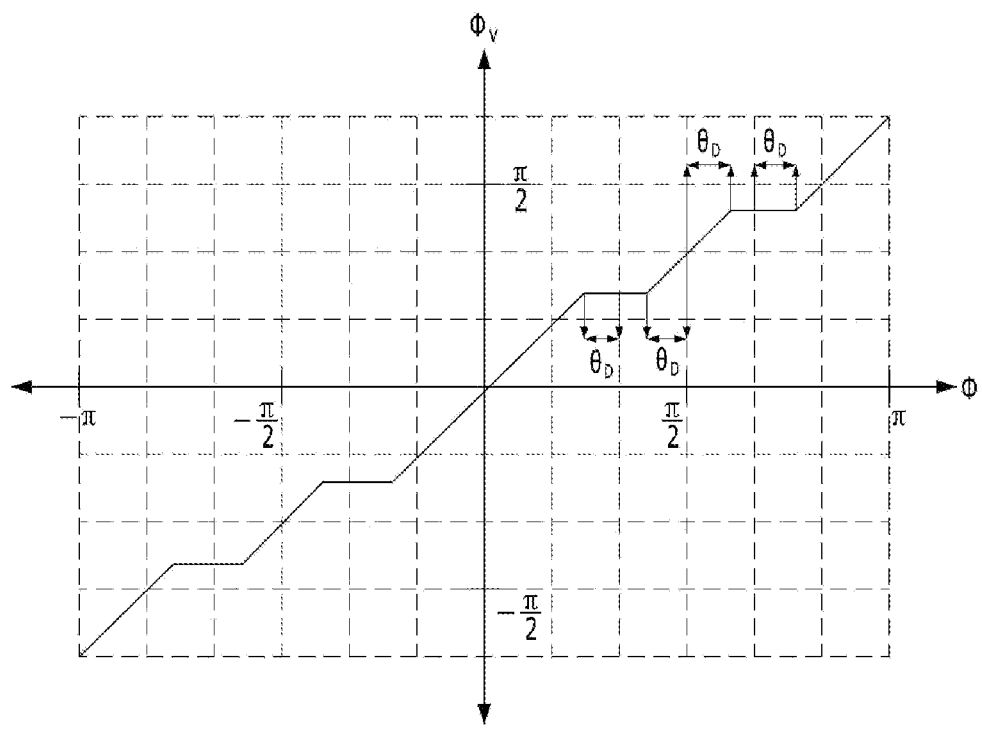
【FIG. 13】
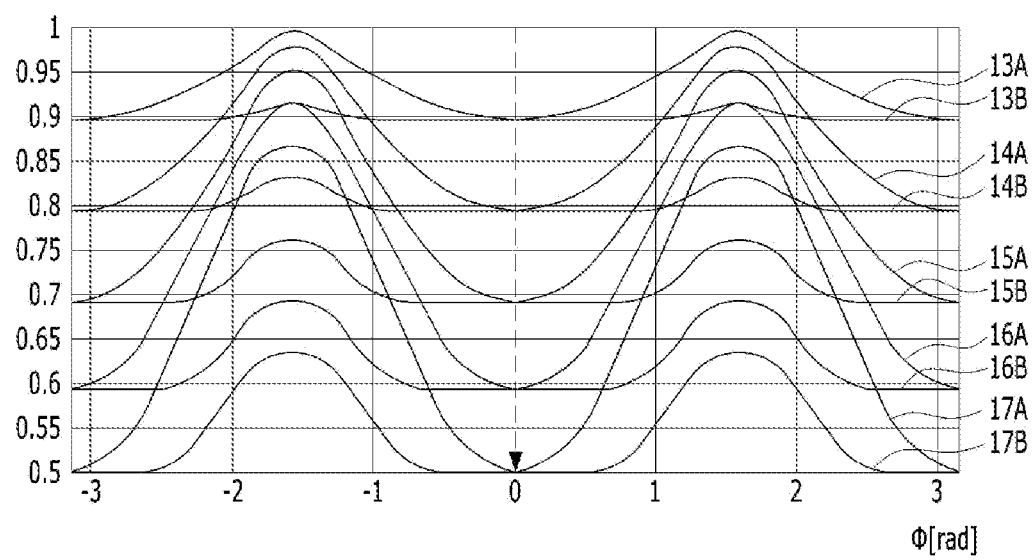

DEVICE FOR CONTROLLING INVERTER

CROSS-REFERENCE TO RELATED APPLICATION

Pursuant to 35 U.S.C. § 119(a), this application claims the benefit of earlier filing date and right of priority to Korean Application No. 10-2018-0062310, filed on May 31, 2018, in the Korean Intellectual Property Office, the disclosure of which is incorporated herein in its entirety by reference.

TECHNICAL FIELD

The present disclosure relates to a device for controlling an inverter.

BACKGROUND

With a development of a power semiconductor technology, a power of VVVF (Variable Voltage and Variable Frequency) may be relatively easily implemented using a power element capable of high-speed switching. An example of a circuit for generating the VVVF may include a voltage-type inverter which convert a DC voltage as an input to an AC variable voltage as an output.

The voltage-type inverter may be mainly used in energy storage system (ESS), photo-voltaic (PV) inverter, and motor drive technology.

Various pulse width modulation schemes have been developed for an application of such voltage type inverters. The pulse width modulation schemes includes a sinusoidal pulse width modulation (SPWM) and a space vector pulse width modulation (SVPWM). The above SPWM and SVPWM may belong to a continuous pulse width modulation scheme.

A discontinuous pulse width modulation scheme is also used to reduce a switching loss in a power semiconductor. A 60° discontinuous pulse width modulation (DPWM) scheme is the most representative discontinuous pulse width modulation scheme. This discontinuous pulse width modulation scheme may be implemented by appropriately selecting an offset voltage in a pulse width modulation scheme using an offset voltage and a triangular carrier wave comparison PWM.

Alternatively, the discontinuous pulse width modulation scheme may include a discontinuous pulse width modulation scheme of adjusting a discontinuous pulse width modulation period. This scheme may achieve an optimal current total harmonic distortion (THD) and loss at each operating point by freely adjusting a duration of the discontinuous pulse width modulation period. This scheme always has a minimum loss when a power factor is 1. Thus, it is necessary to have a minimum loss regardless of the power factor.

SUMMARY

The present disclosure aims to provide an inverter-controlling device which allows a user to control a trade-off between a switching loss and a current THD via adjustment of a discontinuous modulation duration, such that at a given discontinuous modulation duration, there is always a minimum loss regardless of a power factor.

The purpose of the present disclosure is not limited to the above-mentioned purposes. Other purposes and advantages of the present disclosure that are not mentioned may be understood by following descriptions, and will be more clearly understood by embodiments of the present disclosure. It is to be further understood that the purposes and advantages of the present disclosure may be realized and attained by means of means and combinations thereof recited in the appended claims.

In one aspect of the present disclosure, there is provided a device for controlling an inverter, wherein the device achieves a minimum switching loss in a discontinuous modulation duration regardless of a power factor, wherein the inverter includes an inverting module for converting a direct current (DC) stage voltage to an alternate current (AC) voltage, wherein the inverting module includes 3 legs corresponding to 3 phases, wherein each leg has upper and lower switching elements, the device being characterized in that the device includes: a command voltage transform unit configured for transforming each of 3 phases command voltages into each of pole command voltages using the DC stage voltage, a pulse width modulation index, a discontinuous modulation angle corresponding to a discontinuous modulation duration, and each phase difference between each of the 3 phase command voltages and each of 3 phases output currents of the inverting module; and a controller configured for generating a control signal based on a comparison between each pole command voltage and a triangular carrier wave, wherein the control signal controls upper and lower switching elements of each phase leg.

In one implementation, the command voltage transform unit includes: an offset command voltage calculation unit for calculating an offset command voltage from the phase command voltages, the DC stage voltage, the pulse width modulation index, the discontinuous modulation angle, and each phase difference; and a pole command voltage calculation unit for calculating each pole command voltage from each phase command voltage and the offset command voltage.

In one implementation, the offset command voltage calculation unit includes: a first coordinate transform unit for transforming the 3 phases command voltages to stationary reference frame-based d and q axis command voltages; an angular transform unit for transforming each phase-difference between each phase command voltage and each output current into each virtual phase-difference; a rotation transform unit for rotationally-transforming the stationary reference frame-based d and q axis command voltages by each virtual phase-difference; a second coordinate transform unit for transforming the rotation-transformed d and q axis command voltages into virtual 3-phases command voltages; and an offset command voltage generation unit for generating the offset command voltage using the phase command voltages, the DC stage voltage, the pulse width modulation index, the discontinuous modulation angle, and the virtual phase command voltages.

In one implementation, the offset command voltage generation unit includes: a first determination unit for determining a maximum value and a minimum value among the actual 3 phases command voltages; a second determination unit for determining a maximum value and a minimum value among the virtual 3 phases command voltages; and a third determination unit for determining the offset command voltage using the DC stage voltage, the pulse width modulation index, the discontinuous modulation angle, the maximum and minimum values among the actual phase command voltages, and the maximum and minimum values among the virtual phase command voltages.

In one implementation, the third determination unit is configured for determining the offset command voltage using a following equation:

$$\begin{cases} v_{sn}^* = \dfrac{V_{dc}}{2} - v_{max}^*, & \left(\text{if, } v_{max}^V > k\dfrac{V_{dc}}{2}\right) \\ v_{sn}^* = -\dfrac{V_{dc}}{2} - v_{min}^*, & \left(\text{if, } v_{min}^V < -k\dfrac{V_{dc}}{2}\right) \\ v_{sn}^* = -\dfrac{v_{max}^* + v_{min}^*}{2}, & \left(\text{if, } v_{max}^V < k\dfrac{V_{dc}}{2}, v_{min}^V > -k\dfrac{V_{dc}}{2}\right) \end{cases}$$

where $V_{sn}^*$ denotes the offset command voltage, $V_{dc}$ denotes the DC stage voltage, k is defined as $MI\cos\theta_D$, MI denotes the pulse width modulation index, $\theta_D$ denotes the discontinuous modulation angle, $v_{max}^*$ and $v_{min}^*$ denote the maximum and minimum values among the actual phase command voltages respectively, and $v_{max}^V$ and $v_{min}^V$ denote the maximum and minimum values among the virtual phase command voltages respectively.

In one implementation, the phase-difference $\phi$ has a relationship $$0 \le \phi < \frac{\pi}{3} - \theta_D,$$

the angular transform unit is configured for determining the virtual phase-difference $\phi_V$ to have a relationship $\phi_V = \phi$.

In one implementation, the phase-difference $\phi$ has a relationship $$\frac{\pi}{3} - \theta_D \le \phi < \frac{\pi}{2} - \theta_D,$$

the angular transform unit is configured for determining the virtual phase-difference $\phi_V$ to have a relationship $$\phi_V = \frac{\pi}{3} - \theta_D.$$

In one implementation, the phase-difference $\phi$ has a relationship $$\frac{\pi}{2} - \theta_D \le \phi < \frac{\pi}{2},$$

the angular transform unit is configured for determining the virtual phase-difference $\phi_V$ to have a relationship $$\phi_V = \phi - \frac{\pi}{6}.$$

In one implementation, the controller includes: a comparison unit configured for: comparing each polar command voltage with a triangular carrier wave; when a difference between each polar command voltage and the triangular carrier wave is positive or zero, outputting 1 as a switching function of an upper switching element of each leg; or when a difference between each polar command voltage and the triangular carrier wave is negative, outputting 0 as a switching function of an upper switching element of each leg; and an inversion unit configured for inverting the output of the comparison unit and for outputting the inverted output as a switching function of a lower switching element of each leg.

In one implementation, a period of the triangular carrier wave corresponds to a switching frequency, and maximum and minimum values of the triangular carrier wave are $$\frac{V_{dc}}{2}$$

and $$-\frac{V_{dc}}{2}$$

respectively.

The control device in accordance with the present disclosure uses the phase-difference between the command voltage and output current, and the discontinuous modulation angles that are used to control the discontinuous pulse width modulation duration. Further, the control device in accordance with the present disclosure may use the generated virtual command voltage, thereby to always exhibit the possible minimum loss at a given discontinuous pulse width modulation duration regardless of the power factor.

According to the present disclosure, the virtual phase command voltage may be generated via the rotational transformation of the actual phase command voltage. The rotation angle used for this rotation transformation may be determined using the phase-difference between the command voltage and the output current and the discontinuous modulation angle. In this way, the pulse width modulation may be performed using the virtual phase command voltage, the actual phase command voltage and the discontinuous modulation angle. The discontinuous modulation duration may be adjusted to properly control the trade-off between the switching loss and current THD. In addition, the present scheme always result in a minimum loss in a given discontinuous modulation duration regardless of the power factor.

Further specific effects of the present disclosure as well as the effects as described above will be described in conduction with illustrations of specific details for carrying out the invention.

BRIEF DESCRIPTION OF THE DRAWINGS

FIG. 1 shows a schematic circuit diagram of a 2-level 3-phase voltage type inverter.

FIG. 2 shows an example to illustrate a triangular carrier wave comparison-based PWM controlled by a PWM controller in FIG. 1.

FIG. 3 shows an example of conversion of an output phase voltage according to a switching function into a space vector.

FIG. 4 shows an operation of an a-phase based 60-degree discontinuous pulse width modulation scheme when a phase command voltage is expressed as a command voltage vector V* in a space vector system.

FIG. 5 is an exemplary diagram for illustrating another implementation of the discontinuous pulse width modulation scheme.

FIG. 6 shows an example to illustrate ADPWM (Adjustable Discontinuous PWM) as another discontinuous pulse width modulation scheme.

FIG. 12 is an example diagram to illustrate an operation of an angular transform unit in FIG. 9.

FIG. 13 is an example diagram for illustrating a switching loss in an inverter-controlling device in accordance with one embodiment of the present disclosure.

DETAILED DESCRIPTION

Figure 7:
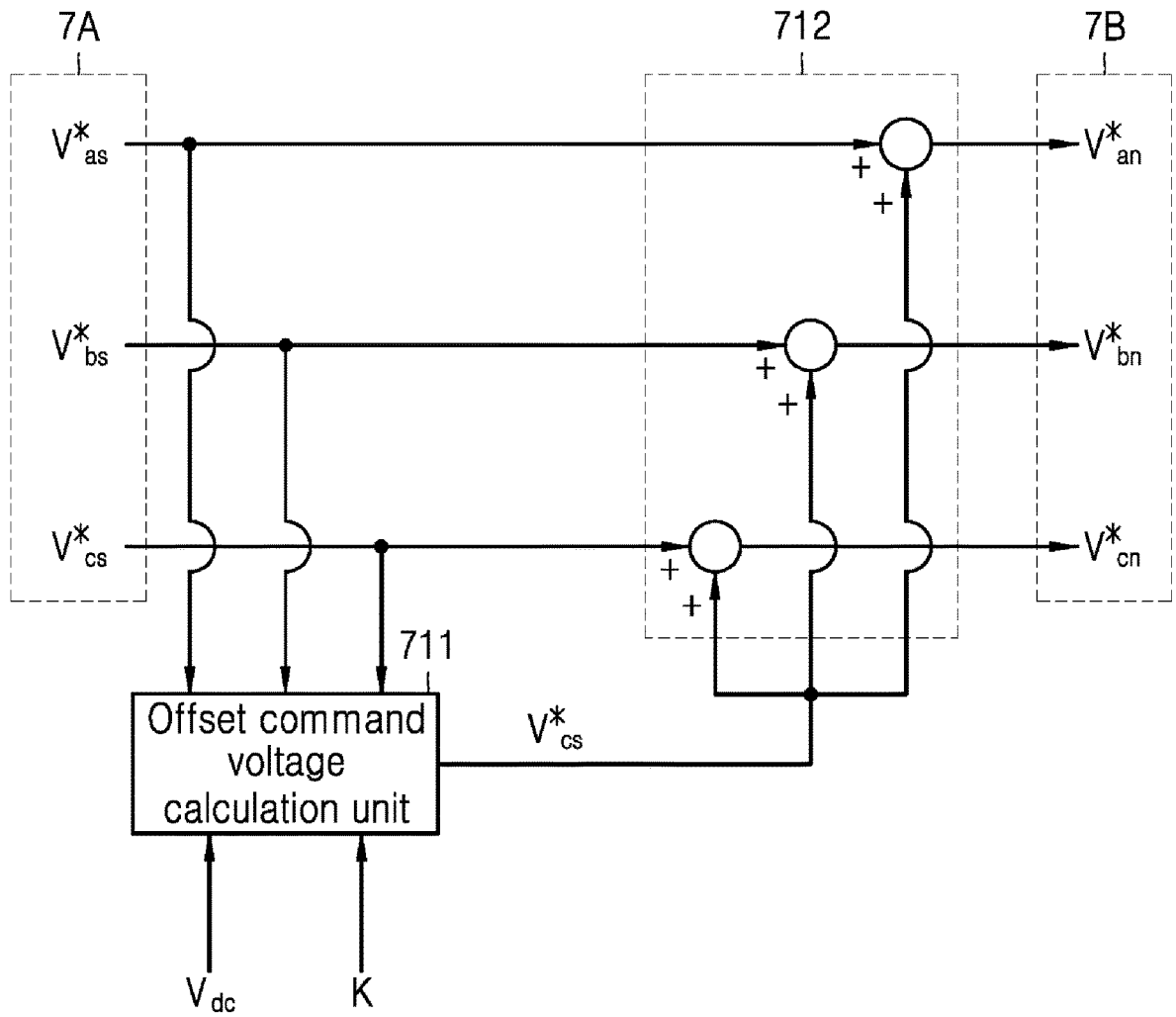
FIG. 7 shows a circuit configuration for an implementation of the ADPWM.

Hereinafter, a device for controlling an inverter in accordance with the present disclosure will be described with reference to the accompanying drawings.

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Embodiments are described in sufficient detail to enable those skilled in the art in the art to easily practice the technical idea of the present disclosure. It is intended to cover alternatives, modifications, and equivalents as may be included within the spirit and scope of the present disclosure as defined by the appended claims.

Unless defined otherwise, all terms used herein have the same meaning as commonly understood by one of ordinary skill in the art. When the terms used herein are in conflict with a general meaning of the term, the meaning of the term is in accordance with a definition used herein.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Hereinafter, an inverter-controlling device and method according to an embodiment of the present disclosure will be described with reference to FIGS. 2A to 5.

FIG. 1 is a schematic circuit diagram of a 2-level 3-phase voltage type inverter, which is an example of an inverter used for the energy storage system (ESS), photo-voltaic (PV) inverter, and motor drive technology.

The inverter 100 may include a direct current (DC) stage 101 and an inverting module 102. n of the DC stage 101 represents a virtual DC stage neutral point position. The inverting module 102 includes three-phases power switches. $S_a$, $S_b$, and $S_c$ of the inverting module 102 refer to switching functions of three-phase power switches, respectively. $S_a=1$ means that an a-phase upper switch electrically conducts, and $S_a=0$ means that an a-phase lower switch electrically conducts. That is, $S_a$ and $\overline{S_a}$ have a complementary relationship. This may be equally applied to $S_b$ and $S_c$. An alternating voltage from the inverting module 102 is transferred to a load 200 such as a motor.

Command voltages of 3 phases may be input to a pulse width modulation (PWM) controller 110. The PWM controller 110 determines a switching function to be applied to the inverting module 102 and provides the determined switching function to the inverting module 102.

A triangular carrier wave comparison-based modulation as controlled by the PWM controller 110 will be described with reference to FIG. 2.

FIG. 2 shows an example to illustrate a triangular carrier wave comparison-based PWM controlled by a PWM controller in FIG. 1. In FIG. 2, (a) is an example diagram to illustrate generation of pole voltages, and (b) shows a triangular carrier wave comparison-based PWM.

An offset command voltage calculation unit 111 calculates an offset command voltage $v_{sn}^*$ using three-phase phase command voltages 2A. A pole command voltage calculation unit 112 calculates pole command voltages 2B using the three phase command voltages 2A and the offset command voltage $v_{sn}^*$. This process may be expressed as Equation 1 as follows:

$$v_{an}^* = v_{as}^* + v_{sn}^*$$
$$v_{bn}^* = v_{bs}^* + v_{sn}^*$$
$$v_{cn}^* = v_{cs}^* + v_{sn}^*$$
[Equation 1]

The offset voltage is a component that is common to the three-phase pole voltages. Since the offset voltage means a zero-sequence voltage, the offset voltage does not affect synthesis of an inter-line voltage.

Referring to (b) in FIG. 2, a period of a triangular carrier wave 2C, which is to be compared with the pole command voltages 2B corresponds to a switching frequency. Maximum and minimum values of the carrier wave 2C are $$\frac{V_{dc}}{2}$$

and $$-\frac{V_{dc}}{2}$$

respectively.

A comparison unit 113 compares the pole command voltages 2B with the triangular carrier wave 2C. When, as a result of comparison, a difference between each of the pole command voltages 2B and the triangular carrier wave 2C is positive or zero, the switching function may be output as 1. When, as a result of comparison, a difference between each of the pole command voltages 2B and the triangular carrier wave 2C is negative, the switching function may be output as 0.

When we define the triangular carrier wave as $v_{tri}$, each switching function is expressed as each of following Equations 2, 3 and 4:

$$\begin{cases} S_a = 1 & v_{an}^* \geq v_{tri} \\ S_a = 0 & v_{an}^* < v_{tri} \end{cases}$$
[Equation 2]

$$\begin{cases} S_b = 1 & v_{bn}^* \geq v_{tri} \\ S_b = 0 & v_{bn}^* < v_{tri} \end{cases}$$
[Equation 3]

$$\begin{cases} S_c = 1 & v_{cn}^* \geq v_{tri} \\ S_c = 0 & v_{cn}^* < v_{tri} \end{cases}$$
[Equation 4]

An inversion unit 114 may obtain a switching function of each lower switching element of the inverting module 102. Since each lower switching element operates complementarily with each upper switching element, the switching function may be obtained by inverting an output of the comparison unit 113.

FIG. 3 shows a diagram of conversion of an output phase voltage according to a switching function into a space vector. The output phase voltages according to the switching functions may be expressed as Equation 5 below:

$$V_{as} = \frac{V_{dc}}{3}(2S_a - S_b - S_c)$$
$$V_{bs} = \frac{V_{dc}}{3}(2S_b - S_c - S_a)$$
$$V_{cs} = \frac{V_{dc}}{3}(2S_c - S_a - S_b)$$
[Equation 5]

The output phase voltages are composed of a total of 8 voltages $V_0$ to $V_7$ based on the switching functions. For voltage vectors $V_0$ and $V_7$, an voltage is not output. Thus, the voltage vectors $V_0$ and $V_7$ are defined as zero voltage vectors. On the other hand, for voltage vectors $V_1$ to $V_6$, a phase difference between adjacent voltage vectors is 60 degrees. Each of voltage vectors $V_1$ to $V_6$ has a fixed magnitude of $$\frac{2}{3}V_{dc}.$$

Thus, voltage vectors $V_1$ to $V_6$ are defined as effective voltage vectors. The phase command voltages 2A is modulated to an actual voltage via appropriate synthesis between the effective voltage vectors and the zero voltage vectors.

The offset command voltage calculated by the offset command voltage calculation unit 111 of FIG. 2 may have quite various types.

An offset command voltage in a sinusoidal pulse width modulation scheme (SPWM) is expressed by Equation 6 below:

$$v_{sm}^* = 0$$
[Equation 6]

In a space vector pulse width modulation scheme (SVPWM), an offset command voltage may be expressed as a following Equation 7:

$$v_{sn}^* = -\frac{v_{max} + v_{min}}{2}$$
[Equation 7]

where $V_{max}$ refers to the largest phase command voltage among the three phase command voltages, and $V_{min}$ refers to the smallest phase command voltage among the three phase command voltages.

In one example, the offset command voltage of each of Equation 6 and Equation 7 is based on a continuous pulse width modulation scheme in which the switching functions of all 3 phases change over a single carrier wave period.

A pulse width modulation scheme in which a switching function of one phase does not change in order to reduce a switching loss is referred to as a discontinuous pulse width modulation scheme. A typical discontinuous pulse width modulation scheme is as follows.

First, it may be assumed that the phase command voltage is defined as Equation 8 below, and a phase current is defined as Equation 9 below:

$$v_{xs}^* = V_m \cos\theta$$
[Equation 8]

$$i_{xs} = I_m \cos(\theta - \phi)$$
[Equation 9]

In this connection, a subscript 'xs' means a specific phase. For example, as for an a-phase, xs becomes as; xs becomes bs for a b-phase; and xs becomes cs for a c-phase. θ denotes an AC electric angle. φ denotes a phase-difference between the voltage and current. Further, $V_m$ and $I_m$ refer to a peak value of the phase command voltage and the peak value of the current, respectively.

A typical discontinuous pulse width modulation scheme is 60° discontinuous pulse width modulation scheme (DPWM), in which when a period of a AC frequency is 360 degrees, a switching discontinuous duration from an angular point corresponding to the maximum value of the phase command voltage is 60°. An offset command voltage in the 60° discontinuous pulse width modulation scheme may be given by a following Equation 10. This DPWM is a pulse width modulation scheme in which the switching loss is minimized when the phase-difference φ between the phase command voltage and phase current is 0°.

$$\begin{cases} v_{sn}^* = \dfrac{V_{dc}}{2} - v_{max} \ (\text{if, } v_{max} + v_{min} \geq 0) \\ v_{sn}^* = -\dfrac{V_{dc}}{2} - v_{min} \ (\text{if, } v_{max} + v_{min} < 0) \end{cases} \quad \text{[Equation 10]}$$

FIG. 4 shows an operation of an a-phase based 60-degree discontinuous pulse width modulation scheme when a phase command voltage is expressed as a command voltage vector V* in a space vector system.

It may be seen from a shaded area of FIG. 4 that when an a-phase command voltage is positive, and an absolute value thereof is a maximum value among absolute values of the three phases command voltages, an a-phase switching function $S_a$ becomes 1 and thus an a-phase switching element is always in an on state for a certain duration. To the contrary, it may be seen from a shaded area of FIG. 4 that when an a-phase command voltage is negative, and an absolute value thereof is a maximum value among absolute values of the three phases command voltages, the a-phase switching function $S_a$ becomes 0 and thus the a-phase switching element is always in an off state for a certain duration.

This discontinuous pulse width modulation scheme may reduce the switching loss, but may have a disadvantage that the total harmonic distortion (THD) of the current increases. The continuous pulse width modulation scheme has a lower current THD than that of the discontinuous pulse width modulation scheme. However, the continuous pulse width modulation scheme has a drawback that the switching loss increases.

Further, when, conventionally, the discontinuous pulse width modulation scheme using an offset command voltage is used, a discontinuous pulse width modulation duration is always fixed to 120°, which is ⅓ of a single period of a fundamental wave. As a result, when a pulse width modulation index is low and when the discontinuous pulse width modulation is applied, the current THD is very large.

In one example, an adjustment of the discontinuous modulation duration provides for a degree of freedom for proper selection between the switching loss and current THD. This reduces the switching loss in a region of a low pulse width modulation index compared to the continuous pulse width modulation scheme. Further, a method of reducing the current THD compared to the discontinuous pulse width modulation scheme.

FIG. 5 is an exemplary diagram for illustrating another implementation of the discontinuous pulse width modulation scheme. In FIG. 5, reference numerals 5A, 5B, and 5C refer to a, b, and c-phases command voltages $v_{as}^*$, $v_{bs}^*$ and $v_{cs}^*$ respectively. A reference numeral 5D represents a peak value of each phase command voltage. Each of 5Ds of the 3 phases command voltages is equal to $MI^{V_{dc}}{}_2$ when the pulse width modulation index is defined as MI.

The pulse width modulation index is defined as a following Equation 11:

$$MI = \dfrac{V_m}{V_{dc}/2} \quad \text{[Equation 11]}$$

A reference numeral 5E in FIG. 5 represents a magnitude of a voltage at which the discontinuous pulse width modulation begins. The magnitude 5E of the voltage at which the discontinuous pulse width modulation begins is defined as $$MI\dfrac{V_{dc}}{2}\cos\dfrac{\pi}{6}.$$

Thus, when the a-phase command voltage 5A is greater than the 5E, the a-phase switching function is always 1. When the a-phase command voltage 5A is smaller than a negative 5E, the a-phase switching function is always 0. This may be equally applied to the b-phase command voltage 5B and the c-phase command voltage 5C.

Thus, the implementation of the 60° discontinuous pulse width modulation scheme may be redefined as a following Equation 12:

$$\begin{cases} v_{sn}^* = \dfrac{V_{dc}}{2} - v_{max} \ \left(\text{if, } v_{max} > k\dfrac{V_{dc}}{2}\right) \\ v_{sn}^* = -\dfrac{V_{dc}}{2} - v_{min} \ \left(\text{if, } v_{min} < -k\dfrac{V_{dc}}{2}\right) \end{cases} \quad \text{[Equation 12]}$$

where, k is defined as $$MI\cos\dfrac{\pi}{6}.$$

FIG. 6 shows an example to illustrate ADPWM (Adjustable Discontinuous PWM) as another discontinuous pulse width modulation scheme.

In FIG. 6, reference numerals 6A, 6B and 6C denote a, b, c-phases command voltages $V_{as}^*$, $v_{bs}^*$ and $v_{cs}^*$ respectively. A reference numeral 6D represents a peak value of each phase command voltage. Each of 6Ds of the 3 phases command voltages is equal to $MI^{V_{dc}}{}_2$ when the pulse width modulation index is defined as MI. A reference numeral 6E in FIG. 6 represents a magnitude of a voltage at which the discontinuous pulse width modulation begins. The magnitude 6E of the voltage at which the discontinuous pulse width modulation begins is defined as $$MI\dfrac{V_{dc}}{2}\cos\theta_D.$$

In this connection, $\theta_D$ refers to a discontinuous pulse width modulation angle representing a length of a discontinuous pulse width modulation duration. When $\theta_D$ is zero, the space vector pulse width modulation as a continuous pulse width modulation scheme is achieved. When $\theta_D$ is 30°, the 60° discontinuous pulse width modulation scheme as described above is achieved.

Further, in FIG. 6, a reference numeral 6F means a duration during which a corresponding phase switching element does not perform a switching operation. In FIG. 6, a reference numeral 6G means a duration during which a corresponding phase switching element performs a normal switching operation. When the a-phase command voltage 6A is greater than 6E, then the a-phase switching function is always 1, so that the a-phase switching element performs a switching operation for the duration 6F for which the a-phase switching element does not perform the switching operation. When the a-phase command voltage 6A is smaller than a negative 6E, then the a-phase switching function is always 0, so that the a-phase switching element performs a switching operation for the duration 6F for which the a-phase switching element does not perform the switching operation. This may be equally applied to the b-phase command voltage 6B and the c-phase command voltage 6C.

Thus, the implementation of the ADPWM may be redefined as Equation 13 below:

$$\begin{cases} v_{sn}^* = \frac{V_{dc}}{2} - v_{max} & \left(\text{if}, v_{max} > k\frac{V_{dc}}{2}\right) \\ v_{sn}^* = -\frac{V_{dc}}{2} - v_{min} & \left(\text{if}, v_{min} < -k\frac{V_{dc}}{2}\right) \\ v_{sn}^* = -\frac{v_{max} + v_{min}}{2} & \left(\text{if}, v_{max} < k\frac{V_{dc}}{2}, v_{min} > -k\frac{V_{dc}}{2}\right) \end{cases}$$ [Equation 13]

where, k is defined as $MIcos\theta_D$.

FIG. 7 shows a configuration diagram of an implementation of the ADPWM.

For the implementation of the ADPWM, an offset command voltage calculation unit 711 receives 3 phases command voltages 7A, a DC stage voltage $V_{dc}$ and a k value defined in the above Equation 13 and then calculates an offset command voltage. A pole command voltage calculation unit 712 adds the offset command voltage $V_{sn}^*$ to the phase command voltages 7A to calculate three-phases pole command voltages 7B.

Although the discontinuous pulse width modulation scheme as described above may reduce the switching loss, the discontinuous pulse width modulation scheme has the disadvantage of increasing the THD of the current. To overcome this disadvantage, the user may appropriately control a trade-off between the switching loss and the current THD by adjusting the discontinuous modulation duration.

Especially when the pulse width modulation index MI is small, the discontinuous pulse width modulation scheme may be used to reduce the switching loss. In this connection, when using the discontinuous pulse width modulation scheme, the current THD must deteriorate. However, a conventional method may reduce the switching loss in a region of a low modulation index MI as compared to the continuous voltage modulation scheme. Using the conventional method, the current THD may be reduced compared to the discontinuous voltage modulation scheme.

The conventional method as described above has a problem of having a minimum loss only in a state where the power factor is 1 in which the phase difference between the voltage and the current is 0°.

In accordance with the present disclosure, the user may appropriately control the trade-off between the switching loss and the current THD by adjusting the discontinuous modulation duration. Further, in accordance with the present disclosure, an inverter-controlling device may always achieve a minimum loss for a certain discontinuous modulation duration regardless of the power factor.

The inverter-controlling device in accordance with the present disclosure is applied to a two-level three-phases voltage type inverter used for the energy storage system (ESS), photo-voltaic (PV) inverter, and motor drive technology, as shown in FIG. 1. The inverter-controlling device in accordance with the present disclosure is based on a triangular wave pulse width modulation scheme using an offset voltage. Thus, the configuration of FIG. 2 in which the pole command voltages and the triangular carrier wave are compared to each other is applied equally to the present disclosure.

In the conventional ADPWM, both switching discontinuous angular durations are present around an angular point corresponding to a maximum value of each phase command voltage. Each of both switching discontinuous angular durations is $\theta_D$. In this scheme, the switching loss is minimized when the phase-difference ϕ between each phase command voltage and each phase current is zero. That is, both switching discontinuous angular durations occurs around an angular point corresponding to a maximum value of each phase current. Each of both switching discontinuous angular durations is $\theta_D$. Therefore, this scheme has a minimum loss compared to other discontinuous pulse width modulation schemes.

One embodiment of the present disclosure is based on this scheme. In one embodiment of the present disclosure, a minimal loss may be achieved using a virtual command voltage in spite of a non-zero phase-difference between the actual command voltage and actual output current. That is, regardless of the power factor, the minimum loss may occur at a certain discontinuous modulation angle $\theta_D$. One embodiment of the present disclosure may be implemented by applying the ADPWM based on the virtual command voltage such that a phase of the virtual command voltage coincides with a phase of the current as much as possible.

Figure 8:
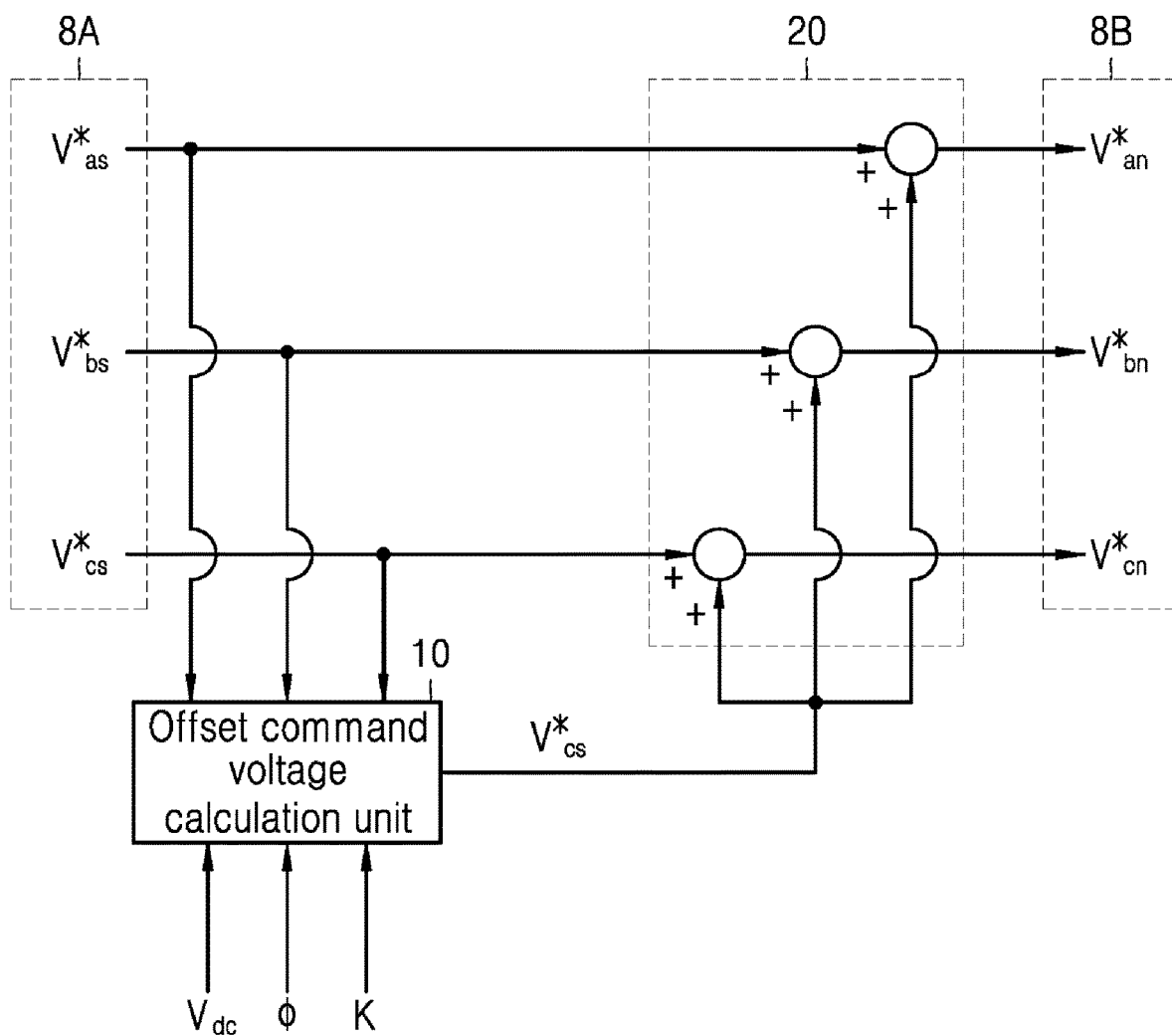
FIG. 8 is an example of converting a phase command voltage to a pole command voltage in an inverter-controlling device according to one embodiment of the present disclosure.

FIG. 8 shows an example configuration of converting the phase command voltage to the pole command voltage in the inverter-controlling device in accordance with an embodiment of the present disclosure.

As shown in FIG. 8, an inverter-controlling device in accordance with an embodiment of the present disclosure may include an offset command voltage calculation unit 10 and a pole command voltage calculation unit 20.

The inverter-controlling device in accordance with an embodiment of the present disclosure calculates an offset command voltage with a minimal loss for the ADPWM. To this end, the offset command voltage calculation unit 10 according to an embodiment of the present disclosure uses phase voltages 8A of three phases, a DC stage voltage $V_{DC}$, the k value, a phase-difference 4 between each phase command voltage and each phase inverter output current to calculate each phase offset command voltage. In this connection, the k value is defined as $MIcos\theta_D$, the pulse width modulation index is denoted as MI, and $\theta_D$ refers to the discontinuous modulation angle which may control the discontinuous modulation duration.

The pole command voltage calculation unit 20 may generate each pole command voltage 8B by adding each offset command voltage to each phase command voltage 8A.

Figure 9:
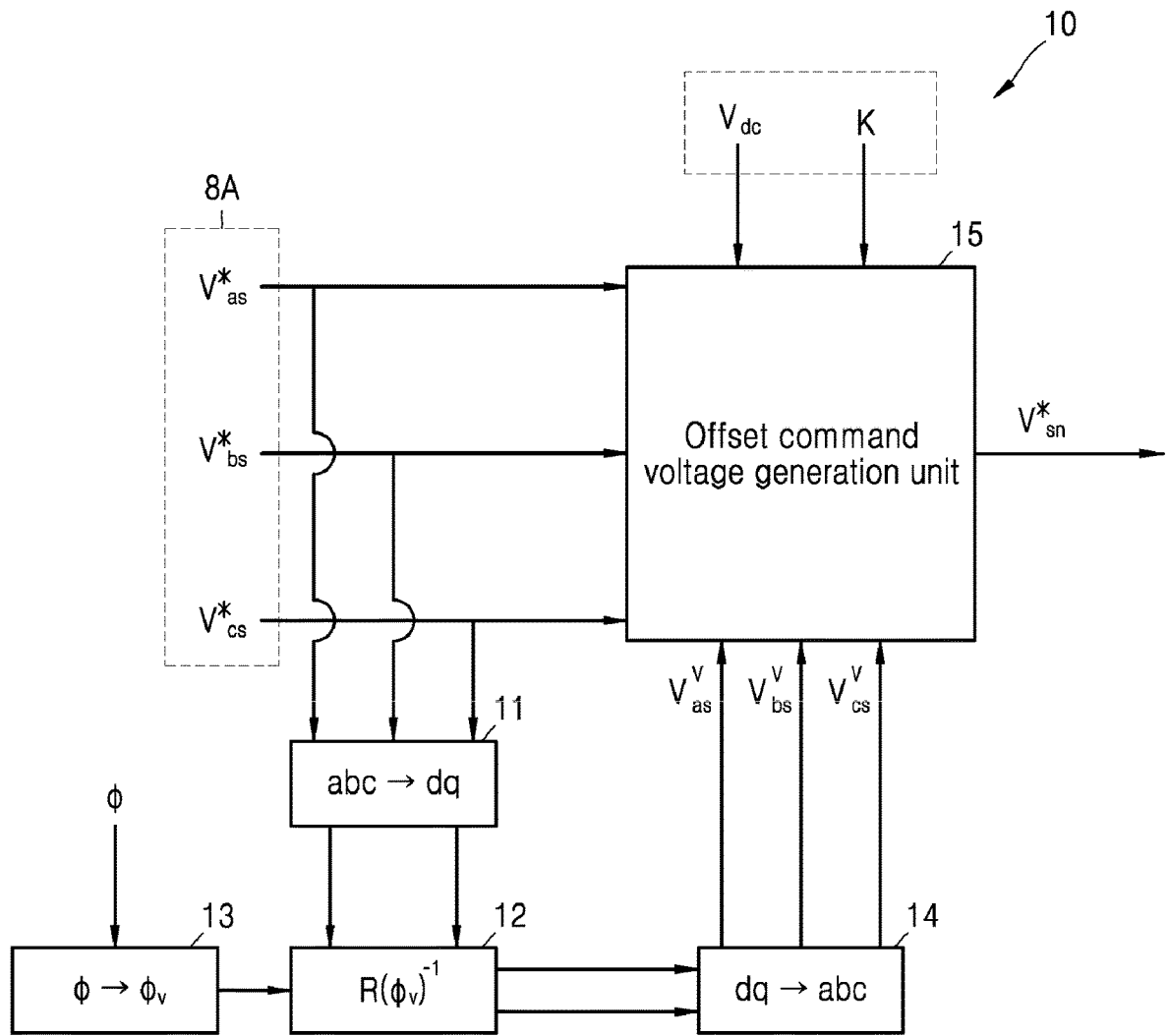
FIG. 9 shows a detailed configuration of an offset command voltage calculation unit in FIG. 8.

FIG. 9 shows a detailed configuration of the offset command voltage calculation unit 10 in FIG. 8.

As shown in FIG. 9, the offset command voltage calculation unit 10 in accordance with an embodiment of the present disclosure includes a first coordinate transform unit 11, a rotation transform unit 12, an angular transform unit 13, a second coordinate transform unit 14, and an offset command voltage generation unit 15.

The first coordinate transform unit 11 may transform a, b, and c-phase variables into stationary reference frame d and q axis variables and may be expressed as Equation 14 below.

$$\frac{2}{3}\begin{pmatrix} 1 & -\frac{1}{2} & -\frac{1}{2} \\ 0 & \frac{\sqrt{3}}{2} & -\frac{\sqrt{3}}{2} \end{pmatrix} \quad \text{[Equation 14]}$$

Therefore, the 3-phase phase command voltages may be transformed by the first coordinate transform unit 11 into the d and q-axis command voltages as expressed in Equation 15 below:

$$\begin{pmatrix} v_{ds}^* \\ v_{qs}^* \end{pmatrix} = \frac{2}{3}\begin{pmatrix} 1 & -\frac{1}{2} & -\frac{1}{2} \\ 0 & \frac{\sqrt{3}}{2} & -\frac{\sqrt{3}}{2} \end{pmatrix}\begin{pmatrix} v_{as}^* \\ v_{bs}^* \\ v_{cs}^* \end{pmatrix} \quad \text{[Equation 15]}$$

The rotation transform unit 12 may rotate the d and q axis variables by $\phi_V$ and may be expressed as Equation 16 below:

$$R(\theta)^{-1} = \begin{pmatrix} \cos\theta & -\sin\theta \\ \sin\theta & \cos\theta \end{pmatrix} \quad \text{[Equation 16]}$$

Therefore, the command voltages based the d and q axes passing through the first coordinate transform unit 11 may be transformed, by the rotation transform unit 12, into rotated d and q axis command voltages as expressed as Equation 17 below:

$$\begin{pmatrix} v_{ds}^V \\ v_{qs}^V \end{pmatrix} = \begin{pmatrix} \cos\phi_V & -\sin\phi_V \\ \sin\phi_V & \cos\phi_V \end{pmatrix}\begin{pmatrix} v_{ds}^* \\ v_{qs}^* \end{pmatrix} \quad \text{[Equation 17]}$$

The second coordinate transform unit 14 may coordinate-transform the d and q axis variables to a, b, and c-phase variables, and may be expressed as Equation 18 below:

$$\begin{pmatrix} 1 & 0 \\ -\frac{1}{2} & \frac{\sqrt{3}}{2} \\ -\frac{1}{2} & -\frac{\sqrt{3}}{2} \end{pmatrix} \quad \text{[Equation 18]}$$

Thus, the rotated d and q axis command voltages $v_{ds}^V$ and $v_{qs}^V$ from the rotation transform unit 12 may be transformed by the second coordinate transform unit 14 into virtual phase command voltages $v_{as}^V$, $v_{bs}^V$ and $v_{cs}^V$ as follows:

$$\begin{pmatrix} v_{as}^V \\ v_{bs}^V \\ v_{cs}^V \end{pmatrix} = \begin{pmatrix} 1 & 0 \\ -\frac{1}{2} & \frac{\sqrt{3}}{2} \\ -\frac{1}{2} & -\frac{\sqrt{3}}{2} \end{pmatrix}\begin{pmatrix} v_{ds}^V \\ v_{qs}^V \end{pmatrix} \quad \text{[Equation 19]}$$

In summary, the 3 phases command voltages $v_{as}^*$, $v_{bs}^*$ and $v_{cs}^*$ may be transformed, by the first coordinate transform unit 11, rotation transform unit 12 and second coordinate transform unit 13, into the virtual 3 phases command voltages $v_{as}^V$, $v_{bs}^V$ and $v_{cs}^V$ as expressed by a following Equation 20:

$$\begin{pmatrix} v_{as}^V \\ v_{bs}^V \\ v_{cs}^V \end{pmatrix} = \frac{2}{3}\begin{pmatrix} 1 & 0 \\ -\frac{1}{2} & \frac{\sqrt{3}}{2} \\ -\frac{1}{2} & -\frac{\sqrt{3}}{2} \end{pmatrix} \quad \text{[Equation 20]}$$

$$\begin{pmatrix} \cos\phi_V & -\sin\phi_V \\ \sin\phi_V & \cos\phi_V \end{pmatrix}\begin{pmatrix} 1 & -\frac{1}{2} & -\frac{1}{2} \\ 0 & \frac{\sqrt{3}}{2} & -\frac{\sqrt{3}}{2} \end{pmatrix}\begin{pmatrix} v_{as}^* \\ v_{bs}^* \\ v_{cs}^* \end{pmatrix}$$

In this connection, the angular transform unit 13 may receive the phase-difference $\phi$ between the command voltage and the output current to generate the angular information used for the rotation transformation. This will be described in more detail later.

The offset command voltage generation unit 15 may generate the offset command voltages using the three phases command voltages 8A, the DC stage voltage, the k value, and the virtual three phases command voltages.

Figure 10:
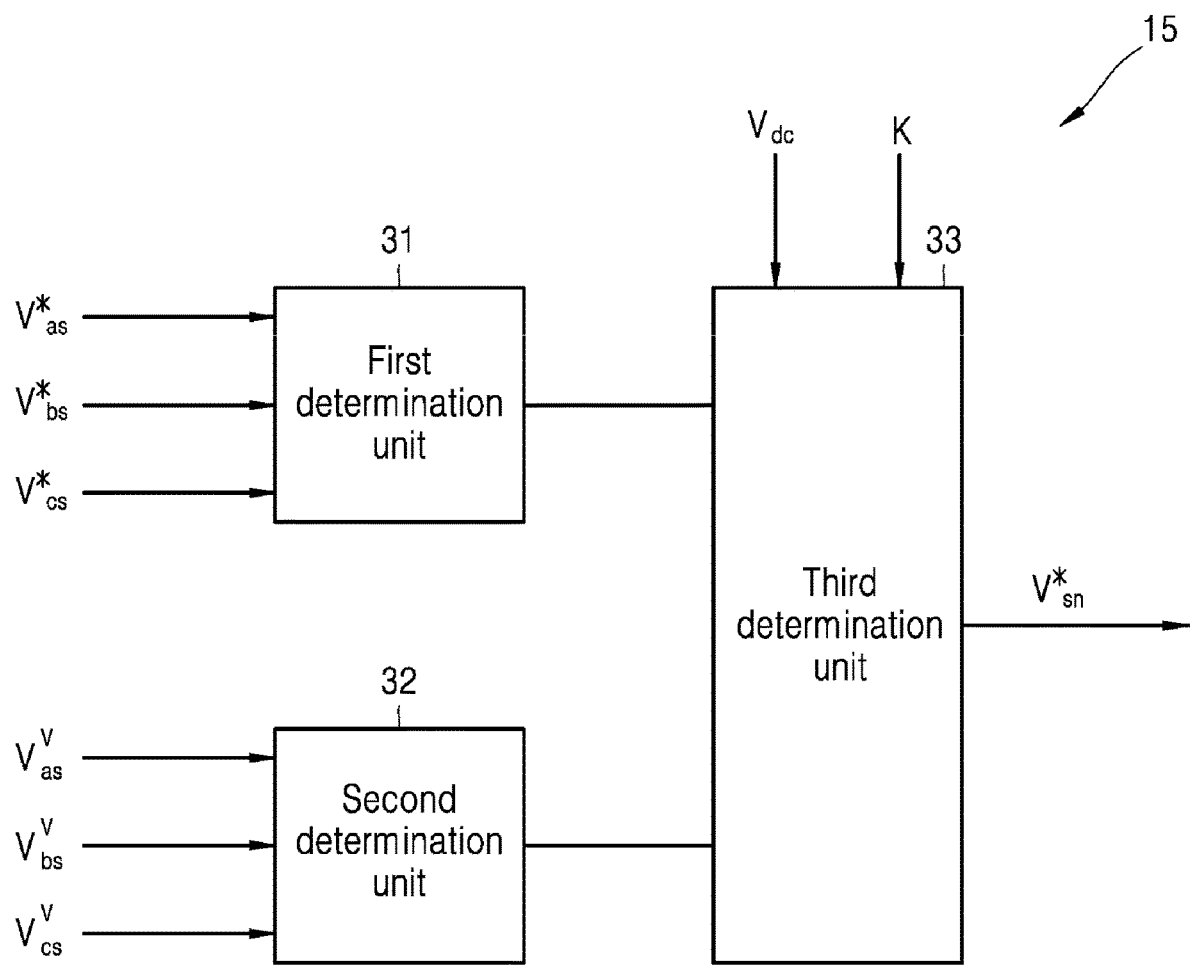
FIG. 10 is a detailed configuration diagram of an embodiment of an offset command voltage generation unit of FIG. 9.

FIG. 10 is a detailed block diagram of an embodiment of the offset command voltage generation unit 15 of FIG. 9.

As shown in FIG. 9, the offset command voltage generation unit 15 in accordance with one embodiment of the present disclosure may include a first determination unit 31, a second determination unit 32, and a third determination unit 33.

The first determination unit 31 may determine maximum and minimum values among the three-phases command voltages as follows:

$$v_{max}^* = \max(v_{as}^*, v_{bs}^*, v_{cs}^*) \quad \text{[Equation 21]}$$

$$v_{min}^* = \min(v_{as}^*, v_{bs}^*, v_{cs}^*)$$

The second determination unit 32 may determine maximum and minimum values among the virtual three-phases command voltages as follows:

$$v_{max}^V = \max(v_{as}^V, v_{bs}^V, v_{cs}^V) \quad \text{[Equation 22]}$$

$$v_{min}^V = \min(v_{as}^V, v_{bs}^V, v_{cs}^V)$$

The third determination unit 33 may determine the offset command voltages using the maximum and minimum values among the three phase command voltages, the DC stage voltage $V_{dc}$, the k value, the maximum and minimum values among the virtual three-phase phase command voltage using a following Equation 23:

$$\begin{cases} v_{sn}^* = \frac{V_{dc}}{2} - v_{max}^*, & \left(\text{if, } v_{max}^V > k\frac{V_{dc}}{2}\right) \\ v_{sn}^* = -\frac{V_{dc}}{2} - v_{min}^*, & \left(\text{if, } v_{min}^V < -k\frac{V_{dc}}{2}\right) \\ v_{sn}^* = -\frac{v_{max}^* + v_{min}^*}{2}, & \left(\text{if, } v_{max}^V < k\frac{V_{dc}}{2}, v_{min}^V > -k\frac{V_{dc}}{2}\right) \end{cases}$$ [Equation 23]

Thus, the generation of the offset command voltage in accordance with an embodiment of the present disclosure may use the three-phase command voltages.

Figure 11:
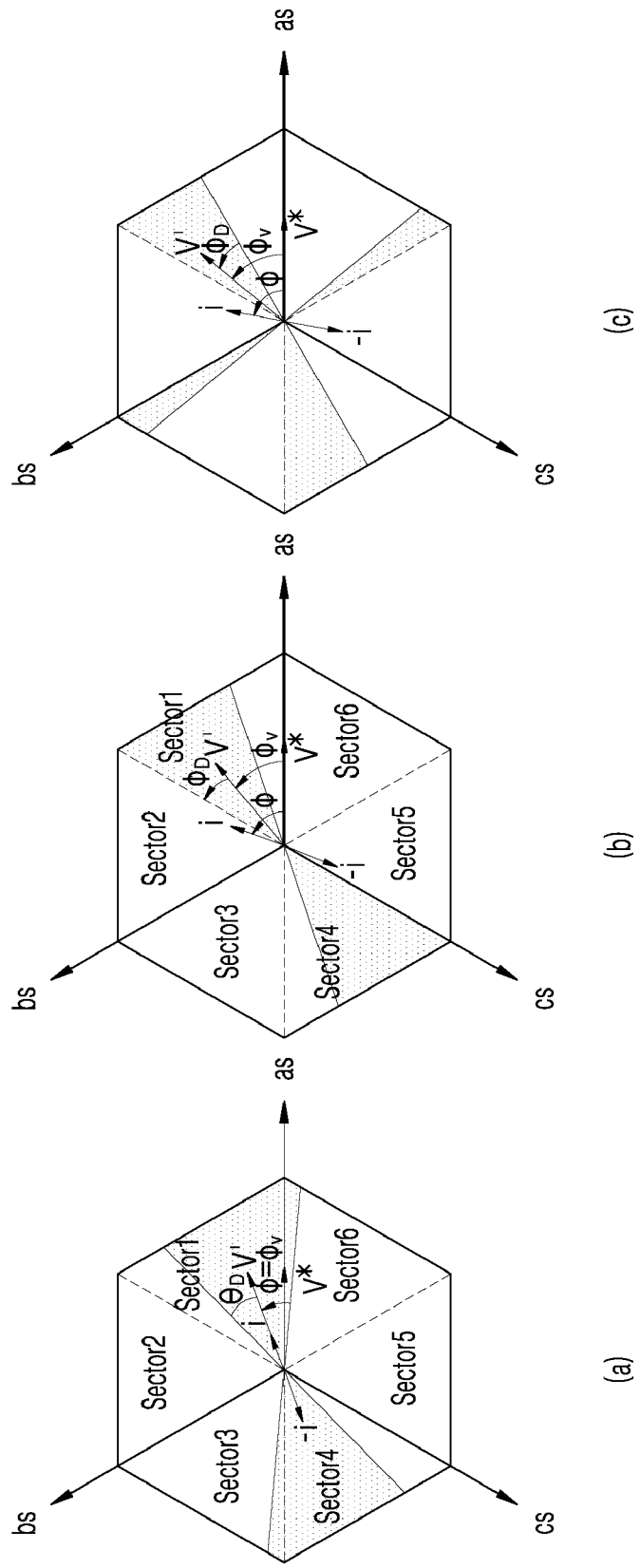
FIG. 11 is an example diagram for illustrating a relation between a phase difference $\phi$ between a command voltage and a current and a virtual phase-difference $\phi_v$ as an angular information used for generation of a virtual phase command voltage according to one embodiment of the present disclosure.

FIG. 11 is an example diagram for illustrating a relation between a phase difference φ between a command voltage and an output current and a virtual phase-difference $\phi_V$ as an angular information used for generation of a virtual phase command voltage according to one embodiment of the present disclosure. In FIG. 11, (a) indicates a command voltage space vector V*, a virtual command voltage space vector $V^V$, and a current space vector i when a phase-difference φ between the command voltage and the output current is $$0 \le \phi < \frac{\pi}{3} - \theta_D.$$

As shown, both $\theta_D$ sized discontinuous modulation durations are present around a current vector i Thus, the phase difference between the current vector and the virtual command voltage vector is 0. To this end, the actual phase-difference φ and a virtual phase-difference $\phi_V$ used for the rotation transformation are equal to each other. That is, when $$0 \le \phi < \frac{\pi}{3} - \theta_D,$$

In FIG. 11, (b) indicates a command voltage space vector V*, a virtual command voltage space vector $V^V$, and a current space vector i when a phase-difference φ between the command voltage and the output current is $$\frac{\pi}{3} - \theta_D \le \phi < \frac{\pi}{2} - \theta_D.$$

For the a-phase, a sector 1, sector 6, sector 3, and sector 4 only correspond to the discontinuous pulse width modulation duration. Therefore, this may disallow the coincidence between the phases of the virtual vector and the current vector. In order to minimize the loss in the discontinuous modulation duration, a difference between the phase of the virtual voltage vector and the phase of the current vector should be minimized. To this end, since an angular point in which $$\phi = \frac{\pi}{3} - \theta_D,$$

the phase $\phi_V$ of the virtual command voltage vector $V^V$ may be fixed to $$\frac{\pi}{3} - \theta_D.$$

That is, when the phase-difference φ between the phases of the command voltage and the output current is $$\frac{\pi}{3} - \theta_D \le \phi < \frac{\pi}{2} - \theta_D, \phi_V = \frac{\pi}{3} - \theta_D.$$

In FIG. 11, (c) indicates a command voltage space vector V*, a virtual command voltage space vector $V^V$, and a current space vector i when a phase-difference φ between the command voltage and the output current is $$\frac{\pi}{2} - \theta_D \le \phi < \frac{\pi}{2}.$$

For the a-phase, a sector 1, sector 6, sector 3, and sector 4 only correspond to the discontinuous pulse width modulation duration. Therefore, this may disallow the coincidence between the phases of the virtual vector and the current vector. In order to minimize the loss in the discontinuous modulation duration, a difference between the phase of the virtual voltage vector and the phase of the current vector should be minimized. To this end, the phase-difference between the virtual command voltage vector $V^V$ and the current vector is fixed to π/6. In this way, the switching loss can be minimized by locating the discontinuous pulse width modulation duration appropriately into the sector 1, sector 6, sector 3, and sector 4 based on the current vector.

That is, when the phase-difference φ between the command voltage and the output current is $$\frac{\pi}{2} - \theta_D \le \phi < \frac{\pi}{2}, \phi_V = \phi - \frac{\pi}{6}.$$

FIG. 12 is an example diagram to illustrate the operation of the angular transform unit 13 of FIG. 9. FIG. 12 shows a relationship between the phase-difference φ between the command voltage and the output current and the virtual phase-difference $\phi_V$ used for the generation of the virtual command voltage.

As shown in FIG. 12, when $$0 \le \phi < \frac{\pi}{3} - \theta_D,$$

When $$\frac{\pi}{3} - \theta_D \le \phi < \frac{\pi}{2}, -\theta_D,$$

$$\phi_V = \frac{\pi}{3} - \theta_D.$$

When $$\frac{\pi}{2} - \theta_D \le \phi < \frac{\pi}{2}, \phi_V = \phi - \frac{\pi}{6}.$$

This may form an odd function.

FIG. 13 is an example graph for illustrating the switching loss in the inverter-controlling device in accordance with one embodiment of the present disclosure. A horizontal axis in FIG. 13 denotes the phase-difference between the command voltage and the output current. A vertical axis represents the ratio of the switching loss of the discontinuous pulse width modulation scheme to the switching loss of the continuous pulse width modulation scheme. That is, when the switching loss ratio is 1, the same switching loss between the continuous and discontinuous pulse width modulation schemes is exhibited. The ratio 0.5 means that the switching loss of the discontinuous pulse width modulation scheme is reduced by 50% compared with the continuous pulse width modulation scheme.

In FIG. 13, reference numerals 13A and 13B indicate the switching loss ratio according to the conventional ADPWM and the switching loss ratio according to one embodiment of the present disclosure respectively when a discontinuous modulation angle $\theta_D$ thereof is set to 6°. Reference numerals 14A and 14B indicate the switching loss ratio according to the conventional ADPWM and the switching loss ratio according to one embodiment of the present disclosure respectively when a discontinuous modulation angle $\theta_D$ thereof is set to 12°. Reference numerals 15A and 15B indicate the switching loss ratio according to the conventional ADPWM and the switching loss ratio according to one embodiment of the present disclosure respectively when a discontinuous modulation angle $\theta_D$ thereof is set to 18°. Reference numerals 16A and 16B indicate the switching loss ratio according to the conventional ADPWM and the switching loss ratio according to one embodiment of the present disclosure respectively when a discontinuous modulation angle $\theta_D$ thereof is set to 24°. Reference numerals 17A and 17B indicate the switching loss ratio according to the conventional ADPWM and the switching loss ratio according to one embodiment of the present disclosure respectively when a discontinuous modulation angle $\theta_D$ thereof is set to 30°.

As shown FIG. 13, the conventional ADPWM exhibits a minimum loss when the phase difference $\phi$ between the command voltage and the output current is zero at a given discontinuous pulse width modulation angle. However, the control device in accordance with the present disclosure exhibits a possible minimum loss at a given discontinuous pulse width modulation angle regardless of the phase-difference $\phi$.

Thus, the control device in accordance with the present disclosure uses the phase-difference between the command voltage and output current, and the discontinuous modulation angles that are used to control the discontinuous pulse width modulation duration. Further, the control device in accordance with the present disclosure may use the generated virtual command voltage, thereby to always exhibit the possible minimum loss at a given discontinuous pulse width modulation duration regardless of the power factor.

According to one embodiment of the present disclosure, the virtual phase command voltage may be generated via the rotational transformation of the actual phase command voltage. The rotation angle used for this rotation transformation may be determined using the phase-difference between the command voltage and the output current and the discontinuous modulation angle. In this way, the pulse width modulation may be performed using the virtual phase command voltage, the actual phase command voltage and the discontinuous modulation angle. The discontinuous modulation duration may be adjusted to properly control the trade-off between the switching loss and current THD. In addition, the present scheme always result in a minimum loss in a given discontinuous modulation duration regardless of the power factor.

It will be apparent to those skilled in the art that various modifications and variations may be made in the present invention without departing from the spirit of the present disclosure. The technical scope of the present disclosure is not limited to the contents described in the embodiments but should be determined by the claims and equivalents thereof.

What is claimed is:

1. A device for controlling an inverter, wherein the device achieves a minimum switching loss in a discontinuous modulation duration regardless of a power factor,
   wherein the inverter includes an inverting module for converting a direct current (DC) stage voltage to an alternate current (AC) voltage, wherein the inverting module includes 3 legs corresponding to 3 phases, wherein each leg has upper and lower switching elements,
   the device being characterized in that the device includes:
   a command voltage transform unit and configured for transforming each of 3 phases command voltages into each of pole command voltages using the DC stage voltage, a pulse width modulation index, a discontinuous modulation angle corresponding to a discontinuous modulation duration, and each phase difference between each of the 3 phase command voltages and each of 3 phases output currents of the inverting module; and
   a controller configured for generating a control signal based on a comparison between each pole command voltage and a triangular carrier wave, wherein the control signal controls upper and lower switching elements of each phase leg.

2. The device of claim 1, wherein the command voltage transform unit includes:
   an offset command voltage calculation unit for calculating an offset command voltage from the phase command voltages, the DC stage voltage, the pulse width modulation index, the discontinuous modulation angle, and each phase difference; and
   a pole command voltage calculation unit for calculating each pole command voltage from each phase command voltage and the offset command voltage.

3. The device of claim 2, wherein the offset command voltage calculation unit 10 includes:
   a first coordinate transform unit for transforming the 3 phases command voltages to stationary reference frame-based d and q axis command voltages;
   an angular transform unit for transforming each phase-difference between each phase command voltage and each output current into each virtual phase-difference;
   a rotation transform unit for rotationally-transforming the stationary reference frame-based d and q axis command voltages by each virtual phase-difference;
   a second coordinate transform unit for transforming the rotation-transformed d and q axis command voltages into virtual 3-phases command voltages; and an offset command voltage generation unit for generating the offset command voltage using the phase command voltages, the DC stage voltage, the pulse width modulation index, the discontinuous modulation angle, and the virtual phase command voltages.

4. The device of claim 3, wherein the offset command voltage generation unit includes:
- a first determination unit for determining a maximum value and a minimum value among the actual 3 phases command voltages;
- a second determination unit for determining a maximum value and a minimum value among the virtual 3 phases command voltages; and
- a third determination unit for determining the offset command voltage using the DC stage voltage, the pulse width modulation index, the discontinuous modulation angle, the maximum and minimum values among the actual phase command voltages, and the maximum and minimum values among the virtual phase command voltages.

5. The device of claim 4, wherein the third determination unit is configured for determining the offset command voltage using a following equation:

$$\begin{cases} v_{sn}^* = \frac{V_{dc}}{2} - v_{max}^*, & \left(\text{if, } v_{max}^V > k\frac{V_{dc}}{2}\right) \\ v_{sn}^* = -\frac{V_{dc}}{2} - v_{min}^*, & \left(\text{if, } v_{min}^V < -k\frac{V_{dc}}{2}\right) \\ v_{sn}^* = -\frac{v_{max}^* + v_{min}^*}{2}, & \left(\text{if, } v_{max}^V < k\frac{V_{dc}}{2}, v_{min}^V > -k\frac{V_{dc}}{2}\right) \end{cases}$$

where $v_{sn}^*$ denotes the offset command voltage,
$V_{dc}$ denotes the DC stage voltage,
k is defined as $MI\cos\theta_D$,
MI denotes the pulse width modulation index,
$\theta_D$ denotes the discontinuous modulation angle,
$v_{max}^*$ and $v_{min}^*$ denote the maximum and minimum values among the actual phase command voltages respectively, and
$v_{max}^V$ and $v_{min}^V$ denote the maximum and minimum values among the virtual phase command voltages respectively.

6. The device of claim 3, wherein the phase-difference φ has a relationship $$0 \le \phi < \frac{\pi}{3} - \theta_D,$$

the angular transform unit is configured for determining the virtual phase-difference φV to have a relationship $\phi_V = \phi$.

7. The device of claim 3, wherein the phase-difference φ has a relationship $$\frac{\pi}{3} - \theta_D \le \phi < \frac{\pi}{2}, -\theta_D,$$

the angular transform unit 13 is configured for determining the virtual phase-difference φV to have a relationship $$\phi_V = \frac{\pi}{3} - \theta_D.$$

8. The device of claim 3, wherein the phase-difference φ has a relationship $$\frac{\pi}{2} - \theta_D \le \phi < \frac{\pi}{2},$$

the angular transform unit 13 is configured for determining the virtual phase-difference φV to have a relationship $$\phi_V = \phi - \frac{\pi}{6}.$$

9. The device of claim 3, wherein the controller includes:
a comparison unit configured for:
- comparing each polar command voltage with a triangular carrier wave;
- when a difference between each polar command voltage and the triangular carrier wave is positive or zero, outputting as a switching function of an upper switching element of each leg; or
- when a difference between each polar command voltage and the triangular carrier wave is negative, outputting as a switching function of an upper switching element of each leg; and an inversion unit configured for inverting the output of the comparison unit and for outputting the inverted output as a switching function of a lower switching element of each leg.

10. The device of claim 9, wherein a period of the triangular carrier wave corresponds to a switching frequency, and maximum and minimum values of the triangular carrier wave are $$\frac{V_{dc}}{2}$$

and $$-\frac{V_{dc}}{2}$$

respectively.

* * * * *